United States Patent
Byun et al.

(10) Patent No.: US 11,732,142 B2
(45) Date of Patent: *Aug. 22, 2023

(54) ANTI-REFLECTIVE FILM, POLARIZING PLATE, AND DISPLAY APPARATUS

(71) Applicant: LG CHEM, LTD., Seoul (KR)

(72) Inventors: Jinseok Byun, Daejeon (KR); Kyung Moon Ko, Daejeon (KR); Sang Heon Lee, Daejeon (KR); Kwangseok Seo, Daejeon (KR); Yeongrae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 416 days.

This patent is subject to a terminal disclaimer.

(21) Appl. No.: 16/978,458

(22) PCT Filed: May 14, 2019

(86) PCT No.: PCT/KR2019/006006
§ 371 (c)(1),
(2) Date: Sep. 4, 2020

(87) PCT Pub. No.: WO2019/221573
PCT Pub. Date: Nov. 21, 2019

(65) Prior Publication Data
US 2021/0040330 A1    Feb. 11, 2021

(30) Foreign Application Priority Data

May 18, 2018  (KR) .......................... 10-2018-0057299
May 13, 2019  (KR) .......................... 10-2019-0055866

(51) Int. Cl.
*C08K 7/26*    (2006.01)
*C09D 5/00*    (2006.01)
*C09D 133/10*  (2006.01)

(52) U.S. Cl.
CPC ........... *C09D 5/006* (2013.01); *C09D 133/10* (2013.01); *C08K 7/26* (2013.01); *C08K 2201/003* (2013.01); *C08K 2201/011* (2013.01)

(58) Field of Classification Search
CPC ........ C09D 5/006; C09D 133/10; C09D 4/06; C09D 7/61; C09D 7/67; C09D 7/70; C08K 7/26; C08K 2201/003; C08K 2201/011; C08K 3/36; C08K 2201/005; C08J 2301/12; C08J 2367/02; C08J 2433/06; C08J 7/042; C08J 7/046; C08J 5/18; C08J 7/04; C08J 2333/10; G02B 5/3033; G02B 1/14; G02B 1/111; G02B 5/30; G02F 1/33
USPC ....................................................... 524/493
See application file for complete search history.

(56) References Cited

U.S. PATENT DOCUMENTS

| | | | |
|---|---|---|---|
| 7,323,514 B2 | 1/2008 | Jing et al. | |
| 8,611,010 B2 | 12/2013 | Radcliffe et al. | |
| 9,285,512 B2 | 3/2016 | Shibayama et al. | |
| 9,423,531 B2 | 8/2016 | Ishida et al. | |
| 10,222,510 B2 | 3/2019 | Song et al. | |
| 10,627,547 B2 | 4/2020 | Byun et al. | |
| 10,689,523 B2 | 6/2020 | Seo et al. | |
| 10,711,142 B2 | 7/2020 | Seo et al. | |
| 11,428,848 B2 * | 8/2022 | Byun | ............ G02B 1/111 |
| 11,506,820 B2 * | 11/2022 | Byun | ............ G02B 5/3033 |
| 11,624,857 B2 * | 4/2023 | Byun | ............ C08K 7/24 |
| | | | 428/323 |
| 2006/0147614 A1 | 7/2006 | Mizuno | |
| 2012/0267042 A1 | 10/2012 | Okafuji et al. | |
| 2013/0084442 A1 | 4/2013 | Akutagawa et al. | |
| 2016/0187540 A2 | 6/2016 | Akutagawa et al. | |
| 2017/0343704 A1 | 11/2017 | Kim et al. | |
| 2018/0017713 A1 | 1/2018 | Byun et al. | |
| 2018/0088254 A1 | 3/2018 | Kim et al. | |
| 2018/0223113 A1 | 8/2018 | Seo et al. | |
| 2018/0313978 A1 | 11/2018 | Chang et al. | |
| 2018/0364396 A1 | 12/2018 | Jang et al. | |
| 2019/0025467 A1 | 1/2019 | Byun et al. | |
| 2019/0137658 A1 | 5/2019 | Song et al. | |
| 2019/0137659 A1 | 5/2019 | Song et al. | |
| 2019/0170907 A1 | 6/2019 | Byun et al. | |
| 2020/0257022 A1 | 8/2020 | Byun et al. | |
| 2020/0284948 A1 | 9/2020 | Byun et al. | |
| 2020/0309996 A1 * | 10/2020 | Byun | ............ C08J 7/0427 |

FOREIGN PATENT DOCUMENTS

| | | |
|---|---|---|
| EP | 3670183 A1 | 6/2020 |
| EP | 3677426 A1 | 7/2020 |
| JP | 2006-178123 A | 7/2006 |
| JP | 2006-220733 A | 8/2006 |
| JP | 2007-090861 A | 4/2007 |
| JP | 2009-035594 A | 2/2009 |
| JP | 2009-086360 A | 4/2009 |
| JP | 2010-085894 A | 4/2010 |
| JP | 2010-169963 A | 8/2010 |

(Continued)

OTHER PUBLICATIONS

Machine Translation of WO2012147527 (Year: 2012).*

(Continued)

*Primary Examiner* — Hannah J Pak
(74) *Attorney, Agent, or Firm* — Rothwell, Figg, Ernst & Manbeck, P.C.

(57) ABSTRACT

The present invention relates to an anti-reflective film having mechanical properties such as high abrasion resistance and scratch resistance and excellent optical properties, and a polarizing plate and a display apparatus including the same.

16 Claims, No Drawings

(56) References Cited

FOREIGN PATENT DOCUMENTS

| | | |
|---|---|---|
| JP | 2012-68271 A | 4/2012 |
| JP | 2012-234170 A | 11/2012 |
| JP | 2013-076786 A | 4/2013 |
| JP | 2013-101330 A | 5/2013 |
| JP | 2014-059368 A | 4/2014 |
| JP | 2017-016153 A | 1/2017 |
| JP | 2020-535462 A | 12/2020 |
| JP | 2020-536288 A | 12/2020 |
| KR | 10-2006-0031941 A | 4/2006 |
| KR | 10-2006-0051782 A | 5/2006 |
| KR | 10-2007-0089976 A | 9/2007 |
| KR | 10-2012-0086308 A | 8/2012 |
| KR | 10-2012-0107462 A | 10/2012 |
| KR | 10-2013-0050247 A | 5/2013 |
| KR | 10-2013-0120223 A | 11/2013 |
| KR | 10-2014-0006922 A | 1/2014 |
| KR | 10-2017-0021757 A | 2/2017 |
| KR | 10-2017-0021758 A | 2/2017 |
| KR | 10-2017-0086477 A | 7/2017 |
| KR | 10-2017-0137686 A | 12/2017 |
| KR | 10-2018-0008261 A | 1/2018 |
| KR | 10-2019-0090295 A | 8/2019 |
| KR | 10-2019-0090296 A | 8/2019 |
| TW | 200508648 A | 3/2005 |
| TW | 200639135 A | 11/2006 |
| TW | 201018951 A | 5/2010 |
| TW | 201126196 A | 8/2011 |
| TW | 201303347 A | 1/2013 |
| TW | 201331612 A | 8/2013 |
| TW | 201736870 A | 10/2017 |
| TW | 201803726 A | 2/2018 |
| WO | 2012-147527 A1 | 11/2012 |
| WO | 2016-084729 A1 | 6/2016 |
| WO | 2017043948 A1 | 3/2017 |
| WO | 2017095206 A1 | 6/2017 |
| WO | 2017-142035 A1 | 8/2017 |

OTHER PUBLICATIONS

International Search Report issued for International Application No. PCT/KR2019/006006 dated Aug. 26, 2019, 4 pages.

Extended European Search Report dated Feb. 11, 2021, of the corresponding European Patent Application No. 19803464.7, 13 pages.

* cited by examiner

ANTI-REFLECTIVE FILM, POLARIZING PLATE, AND DISPLAY APPARATUS

CROSS-REFERENCE TO RELATED APPLICATION(S)

This application is a 35 U.S.C. 371 National Phase Entry Application from PCT/KR2019/006006 filed on May 14, 2019, designating the United States, which claims the benefits of filing dates of Korean Patent Application No. 10-2018-0057299 filed with Korean Intellectual Property Office on May 18, 2018, and Korean Patent Application No. 10-2019-0055866 filed with Korean Intellectual Property Office on May 13, 2019, the entire contents of which are incorporated herein by reference.

The present invention relates to an anti-reflective film, a polarizing plate, and a display apparatus.

FIELD OF THE INVENTION

Background of the Invention

In general, a flat panel display device such as a PDP or an LCD is equipped with an anti-reflective film for minimizing reflection of light incident from the outside. A method for minimizing the reflection of light includes a method (anti-glare: AG coating) in which a filler such as a inorganic fine particle is dispersed in a resin and coated onto a substrate film to impart irregularities; a method (anti-reflection: AR coating) of using interference of light by forming a plurality of layers having different refractive indexes on a substrate film; a method for mixing them; etc.

Among them, in the case of the AG coating, the absolute amount of reflected light is equivalent to that of a general hard coating, but a low reflection effect can be obtained by reducing the amount of light entering the eye using light scattering through irregularities. However, since the AG coating has poor screen sharpness due to the surface irregularities, many studies on AR coating have been recently conducted.

As for a film using the AR coating, a multi-layer structure in which a hard coating layer (high refractive index layer), a low reflective coating layer, and the like are laminated on a substrate film has been commercialized. However, the film using a conventional AR coating has a disadvantage in that the reflectance is increased at a portion that is damaged or deformed by rubbing, friction, or like from outside, resulting in a decrease in visibility. Accordingly, many studies have been conducted to obtain an anti-reflective film of which reflectance does not increase even if a part of its surface is damaged or deformed due to external influences.

BRIEF SUMMARY OF THE INVENTION

The present invention provides an anti-reflective film that effectively suppresses an increase of reflectance in a portion that is damaged or deformed by external rubbing, friction, or the like while having mechanical properties such as high abrasion resistance and scratch resistance and excellent optical properties.

The present invention also provides a polarizing plate including the above-mentioned anti-reflective film.

The present invention further provides a display apparatus including the above-mentioned anti-reflective film and providing high screen sharpness.

One aspect of the present invention provides an anti-reflective film including a hard coating layer, and a low refractive index layer satisfying the following Equation 1.

$$0.2\% \geq \Delta R = |R_1 - R_0| \qquad \text{[Equation 1]}$$

In Equation 1,
$R_0$ is an average reflectance of the low refractive index layer in a wavelength range of 380 to 780 nm, and
$R_1$ is an average reflectance in a wavelength range of 380 to 780 nm measured in the same manner as in the measurement method of $R_0$ with respect to the low refractive index layer, after performing a rubbing test in which the surface of the low refractive index layer is rubbed by applying a load of 500 g to a steel wool and reciprocating ten times at a speed of 33 rpm.

In another aspect of the present invention, a polarizing plate including the aforementioned anti-reflective film can be provided.

In other aspect of the present invention, a display apparatus including the aforementioned anti-reflective film can be provided.

Hereinafter, an anti-reflective film according to a specific embodiment of the present invention and a display apparatus including the same will be described in more detail.

As used herein, the low refractive index layer may refer to a layer having a low refractive index, for example, a layer having a refractive index of about 1.2 to 1.6 at a wavelength in a range of 380 to 780 nm or a wavelength of 550 nm.

In addition, the term (meth)acrylate refers to including both acrylate and methacrylate.

Further, the photocurable resin collectively refers to a polymer resin polymerized by irradiation with light, for example, by irradiation with visible light or ultraviolet light.

Further, the fluorine-based compound refers to a compound containing at least one fluorine element in the compound.

According to one embodiment of the present invention, an anti-reflective film including a hard coating layer, and a low refractive index layer satisfying the following Equation 1, can be provided.

$$0.2\% \geq \Delta R = |R_1 - R_0| \qquad \text{[Equation 1]}$$

In Equation 1,
$R_0$ is an average reflectance of the low refractive index layer in a wavelength range of 380 to 780 nm, and
$R_1$ is an average reflectance in a wavelength range of 380 to 780 nm measured in the same manner as in the measurement method of $R_0$ with respect to the low refractive index layer, after performing a rubbing test in which the surface of the low refractive index layer is rubbed by applying a load of 500 g to a steel wool and reciprocating ten times at a speed of 33 rpm.

The anti-reflective film according to one embodiment of the present invention can effectively suppress an increase of reflectance in a portion that is damaged or deformed by external rubbing, friction, or the like. In addition, the anti-reflective film has mechanical properties such as high abrasion resistance and scratch resistance, and excellent optical properties. Consequently, when this is used for a display apparatus, the glare phenomenon caused by light incident from the outside of the apparatus can be significantly improved without deteriorating the quality of the image, and the surface of the apparatus can be effectively protected from external shock, irritation or the like.

More specifically, the low refractive index layer can satisfy Equation 1 described above. In Equation 1, $R_0$ is an average reflectance of the low refractive index layer in a wavelength range of 380 to 780 nm, and $R_1$ is an average reflectance of the low refractive index layer in a wavelength range of 380 to 780 nm after performing a rubbing test.

The rubbing test is a test for rubbing the surface of the low refractive index layer by applying a load of 500 g to a steel wool and reciprocating ten times at a speed of 33 rpm. When the steel wool to which the load is applied is rubbed on the surface of the low refractive index layer, the low refractive index layer may be scraped off to cause partial damage, or the low refractive index layer may be compressed to cause deformation such as thinning of the thickness itself. Therefore, through the degree of change of the average reflectance before and after the rubbing test of Equation 1, it is possible to evaluate the effect of suppressing an increase of reflectance in a portion that is damaged or deformed by external rubbing, friction, or the like.

Since the low refractive index layer is excellent in the effect of suppressing the increase in reflectance, the degree of change of average reflectance (ΔR) before and after the rubbing test of Equation 1 may be 0.2% p or less, 0.18% p, or 0.15% p or less. Since the low refractive index layer may have no change in the average reflectance even after the rubbing test, the degree of change of average reflectance (ΔR) may be zero.

Meanwhile, the low refractive index layer has excellent optical and mechanical properties, and also has low average reflectance in the visible light region, thereby effectively preventing the glare phenomenon of a display apparatus. Specifically, before performing the rubbing test for the low refractive index layer, the average reflectance ($R_0$ value in Equation 1) in the wavelength region of 380 to 780 nm may be 0.1 to 2.0%, 0.2 to 1.9%, or 0.3 to 1.8%.

Further, the low refractive index layer can effectively suppress an increase of reflectance in a portion that is damaged or deformed by external rubbing, friction, or the like. Specifically, after performing the rubbing test, the average reflectance ($R_1$ value in Equation 1) in the wavelength region of 380 to 780 nm may be 0.3 to 2.2%, 0.4 to 2.1%, or 0.5 to 2.0%.

The low refractive index layer according to one embodiment may satisfy the following Equation 2.

$$1 \geq \Delta b^* = |b^*_1 - b^*_0| \quad \text{[Equation 2]}$$

In Equation 2, $b^*_0$ is a b* value in a CIE (L*a*b*) color coordinate system as defined by the International Commission on Illumination; and $b^*_1$ is a b* value in a CIE (L*a*b*) color coordinate system as measured in the same manner as in the measurement method of $b^*_0$ with respect to the low reflective index layer, after performing a rubbing test in which the surface of the low refractive index layer is rubbed by applying a load of 500 g to a steel wool and reciprocating ten times at a speed of 33 rpm. Therefore, through the degree of change in the color of the low refractive index layer before and after the rubbing test of Equation 2, it is possible to evaluate the effect of suppressing the change of color in a portion that is damaged or deformed by external rubbing, friction, or the like.

Since the low refractive index layer is excellent in the effect of suppressing a change of color, the degree of change of color (Δb*) before and after the rubbing test of Equation 2 may be 1 or less, 0.8 or less, or 0.5 or less. Since the low refractive index layer may have no change in color even after the rubbing test, the degree of change of color (Δb*) may be zero.

The $b^*_0$ value in Equation 2 may be a b* value in an initial CIE (L*a*b*) color coordinate system of the low refractive index layer, and specifically, it may be 2 to −10. In the CIE (L*a*b*) color coordinate system, if the b* value is a positive number, it represents a color biased toward yellow, and if the b* value is a negative number, it represents a color biased toward blue. Therefore, the low refractive index layer represents a color coordinate value as described above, and thus can effectively prevent the glare phenomenon while transmitting an image as it is, without changing the image quality of the display device.

Additionally, the low refractive index layer can effectively suppress a change of color in a portion that is damaged by external rubbing, friction, or the like. For example, the b* value ($b^*_1$ value in Equation 2) after performing the rubbing test for the low refractive index layer may be, specifically, from 3 to −9.

Meanwhile, the low refractive index layer may include a binder resin. The binder resin may include a copolymer of a polyfunctional (meth)acrylate-based monomer including a 2- to 4-functional (meth)acrylate-based monomer and a 5- or 6-functional (meth)acrylate-based monomer.

The 2- to 4-functional (meth)acrylate-based monomer may have a pentaerythritol structure at its center, and the type thereof may include, but is not limited to, for example, pentaerythritol di(meth)acrylate, pentaerythritol tri(meth)acrylate, or a mixture thereof.

Specifically, the 2- to 4-functional (meth)acrylate-based monomer having a pentaerythritol structure at its center may be represented by the following Chemical Formula 1.

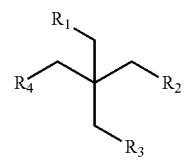

[Chemical Formula 1]

In Chemical Formula 1, $R_1$ to $R_4$ are a hydroxy group, a (meth)acrylate group, or a substituted or unsubstituted $C_{1-40}$ alkoxy group, with the proviso that at least one of them is a (meth)acrylate group.

Meanwhile, the 5- or 6-functional (meth)acrylate-based monomer may have a dipentaerythritol structure at its center, and the type thereof may include, but is not limited to, for example, dipentaerythritol penta(meth)acrylate, dipentaerythritol hexa(meth)acrylate, or a mixture thereof.

Specifically, the 5- or 6-functional (meth)acrylate-based monomer having a dipentaerythritol structure at its center may be represented by the following Chemical Formula 2.

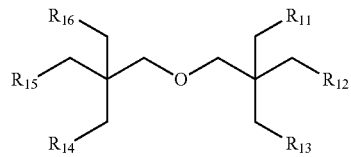

[Chemical Formula 2]

In Chemical Formula 2, $R_{11}$ to $R_{16}$ are a hydroxyl group, a (meth)acrylate group, or a substituted or unsubstituted $C_{1-40}$ alkoxy group, with the proviso that at least one of them is a (meth)acrylate group.

According to the Chemical Formulas 1 and 2, since the 2- to 4-functional (meth)acrylate-based monomer having a pentaerythritol structure has a molecular weight and a volume that are approximately twice as large as the 5- or 6-functional (meth)acrylate-based monomer having a dipentaerythritol structure, a (meth)acrylate having a relatively large molecular weight and volume and a (meth)acrylate having a relatively small molecular weight and volume can maximize the packing density within a unit volume of the copolymer, and thus, not only can the degree of crosslinking be increased, but also the free volume can be minimized.

In addition, when the 2- to 4-functional (meth)acrylate-based monomer and the 5- or 6-functional (meth)acrylate-based monomer are subjected to crosslinking polymerization in a weight ratio of 9:1 to 6:4, 8.5:1.5 to 6.5:3.5, or 8:2 to 7:3, the degree of crosslinking of the copolymer is maximized and the free volume of the low refractive index layer containing them can be minimized. Thereby, it is possible to prevent an increase of reflectance in a portion where external rubbing or friction is applied to the low refractive index layer.

The copolymer made by crosslinking polymerization of the 2- to 4-functional (meth)acrylate and the 5- or 6-functional (meth)acrylate in a weight ratio of 9:1 to 6:4 may have a free volume within a 125 $nm^3$ volume of 420 $Å^3$ or less. When the free volume within a 125 $nm^3$ volume of the copolymer is more than 420 $Å^3$, it is impossible to prevent an increase in the reflectance due to impact strength and frictional damage of the low refractive index layer.

Further, the degree of crosslinking of the low refractive index layer containing the copolymer may be 85% or more, 85 to 99%, 90 to 99%, or 95 to 99%. If the crosslinking density is less than 85%, the reflectance of the portion where the low refractive index layer is damaged or deformed by external rubbing, friction, or the like can be increased.

The low refractive index layer may further include a portion derived from a fluorine-based compound containing a photoreactive functional group. As the binder resin of the low refractive index layer includes a fluorine-based compound containing a photoreactive functional group, it can have lower reflectivity and improved transmissivity, and it is further possible to effectively suppress an increase of reflectance in the portion that is damaged or deformed by external rubbing, friction, or the like. Thus, the low refractive index layer of the anti-reflective film according to one embodiment may further include a copolymer of the polyfunctional (meth)acrylate-based monomer and a fluorine-based compound containing a photoreactive functional group.

One or more photoreactive functional groups may be contained or substituted in the fluorine-based compound containing a photoreactive functional group, wherein the photoreactive functional group means a functional group capable of participating in the polymerization reaction by irradiation with light, for example, by irradiation with visible light or ultraviolet light. The photoreactive functional group may include various functional groups known to be capable of participating in the polymerization reaction by irradiation with light. Specific examples thereof include a (meth)acrylate group, an epoxide group, a vinyl group, and a thiol group.

The fluorine-based compound containing the photoreactive functional group may contain 1 to 60% by weight, 2 to 50% by weight, or 3 to 40% by weight of fluorine. When the content of fluorine is less than 1% by weight, the fluorine component is not sufficiently arranged on the surface of the low refractive index layer, and thus the slip property of the surface can be lowered. When the content of fluorine is more than 60% by weight, the scratch resistance of the low refractive index layer deteriorates, and an increase in the reflectance due to external friction can occur.

The fluorine-based compound containing a photoreactive functional group may further include silicon or a silicon compound. That is, the fluorine-based compound containing a photoreactive functional group can optionally contain silicon or a silicon compound therein. Specifically, the content of silicon in the fluorine-based compound containing a photoreactive functional group may be 0.1 to 20% by weight, 0.5 to 18% by weight, or 1 to 15% by weight. The silicon contained in the fluorine-based compound containing a photoreactive functional group can prevent the generation of haze on the low refractive index layer and serve to enhance transparency. Meanwhile, if the content of silicon in the fluorine-based compound containing a photoreactive functional group is too large, the alkali resistance of the low refractive index layer may be lowered.

The fluorine-based compound containing a photoreactive functional group may have a weight average molecular weight (weight average molecular weight in terms of polystyrene measured by a GPC method) of 2000 to 200,000, 3000 to 180,000, or 4000 to 170,000. If the weight average molecular weight of the fluorine-based compound containing a photoreactive functional group is less than 2000, the fluorine component is not sufficiently arranged on the surface of the low refractive index layer, and thus the slip property of the surface can be lowered. Further, if the weight average molecular weight of the fluorine-based compound is more than 200,000, the scratch resistance of the low refractive index layer deteriorates and the reflectance of a portion that is damaged or deformed by external rubbing, friction, or the like can increase. In addition, since the compatibility between the fluorine-based compound containing a photoreactive functional group and the other components is lowered, uniform dispersion is not achieved at the time of preparing the low refractive index layer, and thus the internal structure or surface properties of the final product may be deteriorated.

Specifically, the fluorine-based compound containing the photoreactive functional group includes: i) an aliphatic compound or an aliphatic cyclic compound in which at least one photoreactive functional group is substituted and at least one fluorine is substituted for at least one carbon; ii) a heteroaliphatic compound or heteroaliphatic cyclic compound in which at least one photoreactive functional group is substituted, at least one hydrogen is substituted with fluorine, and at least one carbon is substituted with silicon; iii) a polydialkylsiloxane-based polymer (for example, a polydimethylsiloxane-based polymer) in which at least one photoreactive functional group is substituted and at least one fluorine is substituted for at least one silicon; iv) a polyether compound in which at least one photoreactive functional group is substituted and at least one hydrogen is substituted with fluorine; or a mixture of two or more of i) to iv) or copolymers thereof.

The low refractive index layer contains 0.1 to 50 parts by weight, 0.3 to 40 parts by weight, or 0.5 to 30 parts by weight of the fluorine-based compound containing the photoreactive functional group based on 100 parts by weight of the copolymer. When the content of the fluorine-based compound containing the photoreactive functional group is less than 0.1 parts by weight relative to the copolymer, the surface slip property of the low refractive index layer may be lowered, and when the content is more than 50 parts by weight, the scratch resistance may be lowered or the reflectance of a portion that is damaged or deformed by external rubbing, friction, or the like may be increased.

Meanwhile, the low refractive index layer includes a binder resin, and two or more groups of hollow inorganic particles dispersed in the binder resin and having different particle diameters.

The two or more groups of hollow inorganic particles having different particle diameters include hollow inorganic particles having a particle diameter of 40 nm to 60 nm and hollow inorganic particles having a particle diameter of 65 nm to 100 nm, which are measured by Dynamic Light Scattering (DLS).

When the two or more groups of hollow inorganic particles having different particle diameters are included in the low refractive index layer, the hollow inorganic particles having relatively small particle diameters are disposed between the hollow inorganic particles having relatively large particle diameters to optimize the arrangement of the hollow inorganic particles, and thus it is possible to prevent an increase in reflectance due to external rubbing or friction, and at the same time, secure physical properties such as abrasion resistance and scratch resistance. Furthermore, the anti-reflective film can enhance the screen sharpness of the display apparatus and also exhibit excellent mechanical properties.

The hollow inorganic particles contained in the low refractive index layer are fine particles having a hollow portion therein, and since the hollow portion contains air having a refractive index of 1.0, it can have a low refractive index of about 1.20 to 1.40. When these particles are included in the low refractive index layer, the refractive index of the low refractive index layer can be controlled to be low even if the density of the hollow inorganic particles themselves is high, and low reflectance resulting therefrom can be achieved.

The weight ratio between one group of the hollow inorganic particles having particle diameters of 40 nm to 60 nm and one group of the hollow inorganic particles having particle diameter of 65 nm to 100 nm may be 7:3 to 3:7, 6:4 to 4:6, or 6.5:4.5 to 5:5. If the above weight ratio is not satisfied, the arrangement of the hollow inorganic particles may be disturbed, and the average reflectance of the low refractive index layer may be increased due to external rubbing or friction.

The two or more groups of hollow inorganic particles having different particle diameters may include one group of hollow inorganic particles having particle diameters of at least 40 nm to 60 nm, 42 to 60 nm, or 45 to 60 nm, and one group of hollow inorganic particles having particle diameters of 65 nm to 100 nm, 65 nm to 95 nm, or 65 nm to 90 nm. If the particle diameter of the hollow inorganic particles is less than 40 nm, the refractive index of the low refractive index layer can be increased and thus the reflectance can be increased, and if the particle diameter is more than 100 nm, the strength of the low refractive index layer may be weakened to thereby reduce the scratch resistance.

The average particle diameter difference between the average particle diameter of one group of the hollow inorganic particles having particle diameters of 40 nm to 60 nm, and the average particle diameter of one group of the hollow inorganic particles having particle diameters of 65 nm to 100 nm, may be 5 nm to 60 nm, 7 nm to 40 nm, or 8 nm to 30 nm. If the particle diameter difference is excessively small or large, the reflectance of a portion where the low refractive index layer is damaged or deformed due to external rubbing, friction, or the like may be increased.

The content of the two or more groups of hollow inorganic particles may be 30 to 500 parts by weight, 50 to 450 parts by weight, or 60 to 400 parts by weight based on 100 parts by weight of the binder resin. If the content of the two or more groups of hollow inorganic particles is less than 30 parts by weight, the reflectance of the low refractive index layer can be increased, and if the content is more than 500 parts by weight, the scratch resistance may be lowered due to the lowering of the content of the binder resin, or the reflectance of a portion that is damaged or deformed by external rubbing, friction, or the like may be increased.

On the other hand, each of the hollow inorganic nanoparticles may contain one or more reactive functional groups selected from the group consisting of a (meth)acrylate group, an epoxide group, a vinyl group, and a thiol group on the surface thereof. As each of the hollow inorganic nanoparticles contains the aforementioned reactive functional groups on the surface thereof, the low refractive index layer can have a higher degree of crosslinking, and thus it is possible to effectively suppress an increase of the reflectance in a portion that is damaged or deformed by external rubbing, friction, or the like, and furthermore, further improved scratch resistance and antifouling property can be ensured.

The surface of the hollow inorganic particles may be coated with a fluorine-based compound. When the surface of the hollow inorganic particles is coated with a fluorine-based compound, the surface energy can be further lowered, and thereby the durability and scratch resistance of the low refractive index layer can be further improved. As a method of coating a fluorine-based compound onto the surface of the hollow inorganic particles, conventionally known particle coating methods, polymerization methods, and the like can be used without particular limitation, and for example, the hollow inorganic particles and the fluorine-based compound may be subjected to sol-gel reaction in the presence of water and a catalyst to bind the fluorine-based compound to the surface of the hollow inorganic particles through hydrolysis and condensation.

Specific examples of the hollow inorganic particles include hollow silica particles. The hollow silica may include a predetermined functional group substituted on the surface in order to be more easily dispersed in an organic solvent. Examples of the organic functional group that can be substituted on the surface of the hollow silica particles are not particularly limited, and for example, a (meth)acrylate group, a vinyl group, a hydroxyl group, an amine group, an allyl group, an epoxy group, a hydroxyl group, an isocyanate group, an amine group, fluorine, or the like may be substituted on the surface of the hollow silica.

The low refractive index layer may have a refractive index of 1.2 to 1.55, 1.25 to 1.45, or 1.3 to 1.43.

On the other hand, a specific example of the low refractive index layer may include: a binder resin including a copolymer of a polyfunctional (meth)acrylate-based monomer containing a 2- to 4-functional (meth)acrylate-based monomer and a 5- or 6-functional (meth)acrylate-based monomer; and two or more groups of hollow inorganic particles dispersed in the binder resin and having different particle diameters.

In addition, since the 2- to 4-functional (meth)acrylate-based monomer and the 5- or 6-functional (meth)acrylate-based monomer are subjected to crosslinking polymerization in a weight ratio of 9:1 to 6:4, 8.5:1.5 to 6.5:3.5, or 8:2 to 7:3, the degree of crosslinking of the copolymer is maximized and the free volume of the low refractive index layer containing them can be minimized. Thereby, it is possible to prevent an increase of the reflectance in a portion where external rubbing or friction is applied to the low refractive index layer.

The weight ratio between one group of the hollow inorganic particles having a particle diameter of 40 nm to 60 nm and one group of the hollow inorganic particles having a particle diameter of 65 nm to 100 nm may be 7:3 to 3:7, 6:4 to 4:6, or 6.5:4.5 to 5:5. If the weight ratio is not satisfied, the arrangement of the hollow inorganic particles may be disturbed, and the average reflectance of the low refractive index layer may be increased due to external rubbing or friction.

The low refractive index layer can be obtained by coating the photocurable coating composition including the copolymer and an inorganic particle onto a predetermined substrate and photo-polymerizing the coated product. The specific type and thickness of the substrate are not particularly limited, and a substrate known to be used in the production of the low refractive index layer or the anti-reflective film can be used without particular limitation.

Meanwhile, the method and apparatus commonly used for coating the photocurable coating composition can be used without particular limitation. For example, a bar coating method, such as Mayer bar method or the like, a gravure coating method, a 2-roll reverse coating method, a vacuum slot die coating method, or the like can be used.

In the step of photo-polymerizing the photocurable coating composition, ultraviolet light or visible light having a wavelength of 200 nm to 400 nm can be irradiated, and the amount of exposure is preferably 100 to 4000 mJ/cm$^2$. The exposure time is not particularly limited, and can be appropriately varied depending on the exposure apparatus used, the wavelength of the irradiated light, or the amount of exposure. Further, in the step of photo-polymerizing the photocurable coating composition, nitrogen purging or the like may be performed to apply nitrogen atmosphere conditions.

The anti-reflective film may have average reflectance of less than 3%, 2.5% or less, or 2% or less in the wavelength range of 380 nm to 780 nm.

On the other hand, as the hard coating layer, a hard coating layer commonly known in the art can be used without particular limitation. One example of the hard coating layer may be a hard coating layer including a binder resin containing a photocurable resin, and organic or inorganic fine particles dispersed in the binder resin.

The aforementioned low refractive index layer may be formed on one side of the hard coating layer, and an additional functional layer may be further included between the low refractive index layer and the hard coating layer.

The photocurable resin is a polymer resin that is polymerized by irradiation with light, for example, by irradiation with visible light or ultraviolet light as previously described, and examples thereof may include at least one selected from a reactive acrylate oligomer group consisting of a urethane acrylate oligomer, an epoxide acrylate oligomer, a polyester acrylate, and polyether acrylate; and a polyfunctional acrylate monomer group consisting of dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethyl propane ethoxy triacrylate, 1,6-hexanediol diacrylate, propoxylated glycerol triacrylate, tripropylene glycol diacrylate, and ethylene glycol diacrylate.

The particle diameter of the organic or inorganic fine particles is not specifically limited, but for example, the organic fine particles may have a particle diameter of 1 to 10 μm, and the inorganic particles may have a particle diameter of 1 nm to 500 nm, or 1 nm to 300 nm.

In addition, specific examples of the organic or inorganic fine particles contained in the hard coating layer are not limited, but for example, the organic or inorganic fine particles may be an organic fine particle composed of an acrylic-based resin, a styrene-based resin, an epoxide resin, and a nylon resin, or an inorganic fine particle composed of silicon oxide, titanium dioxide, indium oxide, tin oxide, zirconium oxide, and zinc oxide.

On the other hand, as another example of the hard coating film, a hard coating layer including a binder resin of a photocurable resin and an antistatic agent dispersed in the binder resin may be mentioned.

The antistatic agent may be a quaternary ammonium salt compound, a conductive polymer, or a mixture thereof. Here, the quaternary ammonium salt compound may be a compound having at least one quaternary ammonium salt group in the molecule, and a low-molecule type or a high-molecule type can be used without limitation. Further, as the conductive polymer, a low-molecule type or a high-molecule type can be used without limitation, and the type thereof may be one conventionally used in the technical field to which the present invention pertains, and thus, the conductive polymer is not particularly limited.

The hard coating layer including a binder resin of the photopolymerizable resin, and an antistatic agent dispersed in the binder resin, may further include at least one compound selected from the group consisting of an alkoxysilane-based oligomer and a metal alkoxide-based oligomer.

The alkoxysilane-based compound may be one that is conventionally used in the relevant art, but preferably, it may be at least one compound selected from the group consisting of tetramethoxysilane, tetraethoxysilane, tetraisopropoxysilane, methyltrimethoxysilane, methyltriethoxysilane, methacryloxypropyl trimethoxysilane, glycidoxypropyl trimethoxysilane, and glycidoxypropyl triethoxysilane.

In addition, the metal alkoxide-based oligomer can be prepared through a sol-gel reaction of a composition including a metal alkoxide-based compound and water. The sol-gel reaction can be carried out by a method similar to the above-described method for preparing an alkoxysilane-based oligomer. However, since the metal alkoxide-based compound can rapidly react with water, the sol-gel reaction can be performed by a method of diluting the metal alkoxide-based compound in an organic solvent and then slowly dripping water thereto.

At this time, considering the reaction efficiency or the like, the molar ratio (based on metal ions) of the metal alkoxide-based compound to water is preferably adjusted within the range of 3 to 170.

Herein, the metal alkoxide-based compound may be at least one compound selected from the group consisting of titanium tetra-isopropoxide, zirconium isopropoxide, and aluminum isopropoxide.

On the other hand, the anti-reflective film may further include a substrate bonded to the other surface of the hard coating layer. The substrate may be a transparent film having light transmittance of 90% or more and a haze of 1% or less. In addition, the material of the substrate may be triacetylcellulose, a cycloolefin polymer, polyacrylate, polycarbonate, polyethylene terephthalate, and the like. Further, the thickness of the substrate film may be 10 to 300 μm in consideration of productivity and the like, but is not limited thereto.

More specifically, the anti-reflective film may further include a light-transmissive substrate of which retardation (Rth) in the thickness direction is 3000 nm or more, 5000 nm or more, or 5000 nm to 20,000 nm as measured at a wavelength of 400 nm to 800 nm.

Specific examples of such a light-transmissive substrate include a uniaxially stretched polyethylene terephthalate film and a biaxially stretched polyethylene terephthalate film.

When the anti-reflective film includes a light-transmissive substrate having retardation in the thickness direction measured at the wavelength of 3000 nm or more, 5000 nm or more, or 5000 nm to 20,000 nm as measured at the wavelength of 400 nm to 800 nm, a rainbow phenomenon due to interference of the visible rays can be reduced as compared with the case of using retardation of less than 3000 nm.

The retardation in the thickness direction can be confirmed by a commonly known measurement method and measurement apparatus. For example, the retardation in the thickness direction can be determined using a measuring apparatus manufactured by AXOMETRICS, Inc. under the trade name of "AxoScan", and the like.

For example, the retardation in the thickness direction can be determined by: inputting a value of a refractive index (589 nm) of the light-transmissive substrate film into the measuring apparatus, then measuring the thickness-direction retardation of the light-transmissive substrate film by using light at a wavelength of 590 nm under conditions of a temperature of 25° C. and a humidity of 40%; and converting the measured value of the thickness-direction retardation thus determined (the value is measured according to the automatic measurement (automatic calculation) of the measuring apparatus) into a retardation value per 10 μm of the thickness of the film. In addition, the size of the light-transmissive substrate as the measurement sample is not particularly limited, as long as it is larger than a light measurement unit (diameter: about 1 cm) of a stage of the measuring apparatus. However, the size may be a length of 76 mm, a width of 52 mm, and a thickness of 13 μm.

The value of the "refractive index (589 nm) of the light-transmissive substrate" utilized in the measurement of the thickness-direction retardation can be determined by: forming an unstretched film including the same kind of resin film as the light-transmissive substrate for forming the film to be measured for the retardation; and then measuring the unstretched film as a measurement sample (in the case where the film to be measured is an unstretched film, the film can be directly used as the measurement sample) for the refractive index for light at 589 nm in an in-plane direction (the direction perpendicular to the thickness direction) of the measurement sample by using a refractive index-measuring apparatus (manufactured by Atago Co., Ltd. under the trade name of "NAR-1T SOLID") as a measuring apparatus under a light source of 589 nm and a temperature condition of 23° C.

According to another embodiment of the present invention, a polarizing plate including the anti-reflective film can be provided. The polarizing plate may include a polarizing film and an anti-reflective film formed on at least one side of the polarizing film.

The material and the production method of the polarizing film are not particularly limited, and conventional materials and production methods known in the art can be used. For example, the polarizing film may be a polyvinyl alcohol polarizing film.

A protective film may be provided between the polarizing film and the anti-reflective film. Examples of the protective film may include, but are not limited to, a COP (cycloolefin polymer)-based film, an acrylic-based film, a TAC (triacetylcellulose)-based film, a COC (cycloolefin copolymer)-based film, and a PNB (polynorbornene)-based film.

In the protective film, a substrate for forming a single coating layer in the production of the anti-reflective film may be used as it is. The polarizing film and the anti-reflective film may be laminated by an adhesive such as an aqueous adhesive or a non-aqueous adhesive.

According to another embodiment of the invention, a display apparatus including the above-mentioned anti-reflective film can be provided. A specific example of the display apparatus is not limited, and for example, it may be a liquid crystal display (LCD), a plasma display device, or an organic light emitting diode (OLED) device.

In one example, the display apparatus includes: a pair of polarizing plates facing each other; a thin film transistor, a color filter, and a liquid crystal cell sequentially stacked between the pair of polarizing plates; and a backlight unit.

In the display apparatus, the anti-reflective film may be provided on the outermost surface of an observer side or a backlight side of the display panel.

In the display apparatus including the anti-reflective film, the anti-reflective film may be positioned on one surface of the polarizing plate relatively far from the backlight unit, among the pair of polarizing plates.

The display apparatus may include a display panel, a polarizing film provided on at least one surface of the panel, and an anti-reflective film provided on the opposite surface and making contact the panel of the polarizing film.

ADVANTAGEOUS EFFECTS

According to the present invention, an anti-reflective film that suppresses an increase of reflectance in a portion that is damaged or deformed by external rubbing, friction, or the like while having mechanical properties such as high abrasion resistance and scratch resistance and excellent optical properties, a polarizing plate including the anti-reflective film, and a display apparatus including the anti-reflective film, can be provided.

DETAILED DESCRIPTION OF THE EMBODIMENTS

Hereinafter, the present invention will be described in more detail by way of examples. However, these examples are given for illustrative purposes only, and the scope of the invention is not intended to be limited to or by these examples.

PREPARATION EXAMPLES 1 to 3

Hard Coating Layer 1

Preparation Example 1

30 g of pentaerythritol triacrylate, 2.5 g of a high molecular weight copolymer (BEAMSET 371, Arakawa Corporation, Epoxy Acrylate, molecular weight: 40,000), 20 g of methyl ethyl ketone, and 0.5 g of a leveling agent (Tego Wet 270) were uniformly mixed. Then, 2 g of acrylic-styrene copolymer resin fine particles (volume average particle size: 2 μm, manufactured by Sekisui Plastic) with a refractive index of 1.525 were added to the mixture to prepare a hard coating composition.

The hard coating composition thus obtained was coated onto a triacetylcellulose film with a #10 Mayer bar and dried at 90° C. for one minute. The dried product was irradiated with ultraviolet light at 150 mJ/cm² to prepare a hard coating layer having a thickness of 4 μm.

Preparation Example 2

The hard coating composition of Preparation Example 1 was coated on a PET film having a thickness of 80 μm and retardation of 10,000 nm with a #10 Mayer bar, and dried at 60° C. for one minute.

The dried product was irradiated with ultraviolet rays at 150 mJ/cm² to prepare a hard coating layer having a thickness of 4 μm.

Preparation Example 3

KYOEISHA salt type of antistatic hard coat solution (solid content: 50 wt %, product name: LJD-1000) was coated on a triacetyl cellulose film with a #10 Mayer bar, and dried at 90° C. for one minute.

The dried product was then irradiated with ultraviolet rays at 150 mJ/cm² to prepare a hard coating layer having a thickness of about 5 μm.

EXAMPLES 1 to 6

Preparation of Anti-Reflective Film

Example 1

Based on 100 parts by weight of a mixed binder of pentaerythritol triacrylate (PETA) and dipentaerythritol hexaacrylate (DPHA) (weight ratio of PETA:DPHA of 7:3), 100 parts by weight of hollow silica nanoparticles (diameter: about 50 to 60 nm, manufactured by JGC Catalyst and Chemicals), 12 parts by weight of a fluorine-based compound (RS-907, DIC), and 13.4 parts by weight of an initiator (Irgacure 127, Ciba) were diluted in a MIBK (methyl isobutyl ketone) solvent so that the solid content concentration became 3 wt % to prepare a photocurable coating composition.

The photocurable coating composition was coated onto the hard coating film of Preparation Example 1 at a thickness of about 110 to 120 nm with a #4 Mayer bar, and dried and cured at 60° C. for one minute to prepare an anti-reflective film.

At the time of curing, ultraviolet light at 252 mJ/cm² was irradiated to the dried coating under a nitrogen purge.

Example 2

Based on 100 parts by weight of a mixed binder of pentaerythritol triacrylate (PETA) and dipentaerythritol hexaacrylate (DPHA) (weight ratio of PETA:DPHA was 6:4), 150 parts by weight of hollow silica nanoparticles (diameter range: about 50 to 60 nm, manufactured by JGC Catalyst and Chemicals), 100 parts by weight of solid silica nanoparticles (diameter: about 15 nm), 16 parts by weight of a fluorine-based compound (RS-90, DIC), and 8 parts by weight of an initiator (Irgacure 127, Ciba) were diluted in MIBK (methyl isobutyl ketone) solvent so that the solid content concentration became 3.5 wt % to prepare a photocurable coating composition.

The photocurable coating composition was coated onto the hard coating film of Preparation Example 1 at a thickness of about 110 to 120 nm with a #4 Mayer bar, dried and cured at 60° C. for one minute to prepare an anti-reflective film.

At the time of curing, ultraviolet light at 252 mJ/cm² was irradiated to the dried coating under a nitrogen purge.

Example 3

Based on 100 parts by weight of a mixed binder of pentaerythritol triacrylate (PETA) and dipentaerythritol hexaacrylate (DPHA) (weight ratio of PETA:DPHA was 7:3), 350 parts by weight of hollow silica nanoparticles (diameter range: about 50 to 60 nm, manufactured by JGC Catalyst and Chemicals), 100 parts by weight of solid silica nanoparticles (diameter: about 13 nm), 30 parts by weight of a fluorine-based compound (F477, DIC), and 37 parts by weight of an initiator (Irgacure 127, Ciba) were diluted in MIBK (methyl isobutyl ketone) solvent so that the solid content concentration became 3.0 wt % to prepare a photocurable coating composition.

The photocurable coating composition was coated onto the hard coating film of Preparation Example 2 at a thickness of about 110 to 120 nm with a #4 Mayer bar, dried and cured at 60° C. for one minute to prepare an anti-reflective film.

At the time of curing, ultraviolet light at 252 mJ/cm² was irradiated to the dried coating under a nitrogen purge.

Example 4

Based on 100 parts by weight of a mixed binder of pentaerythritol triacrylate (PETA) and dipentaerythritol hexaacrylate (DPHA) (weight ratio of PETA:DPHA was 6:4), 400 parts by weight of hollow silica nanoparticles (diameter: about 50 to 60 nm, manufactured by JGC Catalyst and Chemicals), 120.1 parts by weight of solid silica nanoparticles (diameter: about 14 nm), 41 parts by weight of a fluorine-based compound (RS-537, DIC), and 22.2 parts by weight of an initiator (Irgacure 127, Ciba) were diluted in MIBK (methyl isobutyl ketone) solvent so that the solid content concentration became 3.3 wt % to prepare a photocurable coating composition.

The photocurable coating composition was coated onto the hard coating film of Preparation Example 3 at a thickness of about 110 to 120 nm with a #4 Mayer bar, dried and cured at 60° C. for one minute to prepare an anti-reflective film.

At the time of curing, ultraviolet light at 252 mJ/cm² was irradiated to the dried coating under a nitrogen purge.

Example 5

Based on 100 parts by weight of a mixed binder of pentaerythritol triacrylate (PETA) and dipentaerythritol hexaacrylate (DPHA) (weight ratio of PETA:DPHA was 7:3), 323.5 parts by weight of hollow silica nanoparticles (diameter: about 60 to 70 nm, manufactured by JGC Catalyst and Chemicals), 125 parts by weight of solid zirconia nanoparticles (diameter: about 15 nm), 29.4 parts by weight of a fluorine-based compound (RS-90, DIC), and 17.6 parts by weight of an initiator (Irgacure 127, Ciba) were diluted in MIBK (methyl isobutyl ketone) solvent so that the solid content concentration became 3.2 wt % to prepare a photocurable coating composition.

The photocurable coating composition was coated onto the hard coating film of Preparation Example 3 at a thickness of about 110 to 120 nm with a #4 Mayer bar, dried and cured at 60° C. for one minute to prepare an anti-reflective film.

At the time of curing, ultraviolet light at 252 mJ/cm² was irradiated to the dried coating under a nitrogen purge.

Example 6

Based on 100 parts by weight of trimethylol triacrylate (TMPTA), 45 parts by weight of first hollow silica nanoparticles (DLS measured diameter: 58.2 nm), 78 parts by weight of second hollow silica nanoparticles (DLS measured diameter: 66.7 nm), 71 parts by weight of solid silica nanoparticles (diameter: about 15 nm), 23 parts by weight of a fluorine-based compound (RS-90, DIC), and 25 parts by weight of an initiator (Irgacure 127, Ciba) were diluted in MIBK (methyl isobutyl ketone) solvent so that the solid content concentration became 3.1 wt % to prepare a photocurable coating composition.

The photocurable coating composition was coated onto the hard coating film of Preparation Example 1 at a thickness of about 110 to 120 nm with a #4 Mayer bar, dried and cured at 60° C. for one minute to prepare an anti-reflective film. At the time of curing, ultraviolet light at 252 mJ/cm$^2$ was irradiated to the dried coating under a nitrogen purge.

Example 7

Based on 100 parts by weight of a mixed binder of pentaerythritol triacrylate (PETA) and dipentaerythritol hexaacrylate (DPHA) (weight ratio of PETA:DPHA was 8:2), 55 parts by weight of first hollow silica nanoparticles (DLS measured diameter: 58.2 nm), 90 parts by weight of second hollow silica nanoparticles (DLS measured diameter: 66.7 nm), 71 parts by weight of solid silica nanoparticles (diameter: about 15 nm), 25 parts by weight of a fluorine-based compound (RS-90, DIC), and 15 parts by weight of an initiator (Irgacure 127, Ciba) were diluted in MIBK (methyl isobutyl ketone) solvent so that the solid content concentration became 3.1 wt % to prepare a photocurable coating composition.

The photocurable coating composition was coated onto the hard coating film of Preparation Example 3 at a thickness of about 110 to 120 nm with a #4 Mayer bar, dried and cured at 60° C. for one minute to prepare an anti-reflective film. At the time of curing, ultraviolet light at 252 mJ/cm$^2$ was irradiated to the dried coating under a nitrogen purge.

COMPARATIVE EXAMPLES 1 to 6

Preparation of Anti-Reflective Film

Comparative Example 1

An anti-reflective film was prepared in the same manner as in Example 1, except that only pentaerythritol triacrylate (PETA) was used without using a mixed binder.

Comparative Example 2

An anti-reflective film was prepared in the same manner as in Example 2, except that pentaerythritol triacrylate (PETA) and dipentaerythritol hexaacrylate (DPHA) were mixed in a mixing ratio of 5:5.

Comparative Example 3

An anti-reflective film was prepared in the same manner as in Example 3, except that pentaerythritol triacrylate (PETA) and dipentaerythritol hexaacrylate (DPHA) were mixed in a mixing ratio of 4:6.

Comparative Example 4

An anti-reflective film was prepared in the same manner as in Example 4, except that pentaerythritol triacrylate (PETA) and dipentaerythritol hexaacrylate (DPHA) were mixed in a mixing ratio of 2:8.

Comparative Example 5

An anti-reflective film was prepared in the same manner as in Example 5, except that only dipentaerythritol hexaacrylate (DPHA) was used without using a mixed binder.

Comparative Example 6

An anti-reflective film was prepared in the same manner as in Example 6, except that only 123 parts by weight of hollow silica nanoparticles (DLS measured diameter: 58.2 nm) were used instead of 45 parts by weight of first hollow silica nanoparticles (DLS measured diameter: 58.2 nm) and 78 parts by weight of second hollow silica nanoparticles (DLS measured diameter: 66.7 nm).

Evaluation

1. Measurement of Reflectance Rise Before and After Rubbing Test

By applying a load of 500 g to a grade #0000 steel wool and reciprocating ten times at a speed of 33 rpm, the surface in which a hard coating layer and a low refractive index layer of the anti-reflective films obtained in the examples and comparative examples were not formed was subjected to a darkening process so as to prevent transmission of light, and a rubbing test for rubbing the surface of the low refractive index layer was conducted. Thereafter, the average reflectance of the low refractive index layer of the anti-reflective film before and after the rubbing test was measured.

Specifically, before performing the rubbing test, the surface not formed of the hard coating layer and the low refractive index layer was subjected to a darkening process so as to prevent transmission of light, and then the reflectance mode of SolidSpec 3700 (UV-VIS spectrophotometer, SHIMADZU) was used to measure the average reflectance in a wavelength range of 380 nm to 780 nm. The results are shown as "$R_0$" in Table 1 below.

Then, after performing the rubbing test, the average reflectance was measured in the same manner as in the measurement method of $R_0$ with respect to the low refractive index layer, and the results are shown as "$R_1$" in Table 1 below.

In addition, the difference between $R_0$ and $R_1$ was calculated and the degree of change of the reflectance before and after the rubbing test is shown as "$\Delta R$" in Table 1 below.

2. Measurement of Color Coordinate Value (b*)

By applying a load of 500 g to a grade #0000 steel wool and reciprocating ten times at a speed of 33 rpm, the surface in which a hard coating layer and a low refractive index layer of the anti-reflective films obtained in the examples and comparative examples were not formed was subjected to a darkening process so as to prevent transmission of light, and a rubbing test for rubbing the surface of the low refractive index layer was conducted. Before and after the rubbing test, the reflectance mode of SolidSpec 3700 (UV-VIS spectrophotometer, SHIMADZU) was used to measure the average reflectance. Then, the color coordinate value (b*) of the low refractive index layer was measured by using a UV-2401 PC color analysis program.

Specifically, before the rubbing test, the color coordinate values of the low refractive index layer were measured, and the results are shown as "$b^*_0$" in Table 1 below. Thereafter, after performing the rubbing test, the color coordinate values were measured in the same manner as in the measurement of $b^*_0$ for the low refractive index layer, and the results are shown as "$b^*_1$" in Table 1 below. In addition, the difference between $b^*_0$ and $b^*_1$ was calculated, and the degree of change of the color coordinate values before and after the rubbing test is shown as "$\Delta b^*$" in Table 1 below.

3. Measurement of Scratch Resistance

The surfaces of the low refractive index layers obtained in the examples and comparative examples were rubbed while applying a load to a grade #0000 steel wool and reciprocating ten times at a speed of 27 rpm.

Then, a maximum load at which one or less scratches (1 cm or less) was generated as observed by the naked eye was measured, and the results are shown in Table 1 below.

4. Measurement of Anti-Fouling Property

An anti-fouling property was measured by drawing a straight line having a length of 5 cm on surfaces of the anti-reflective films obtained in the examples and comparative examples using a black pen and confirming the number of scrubbing actions required for erasing the straight line at the time of scrubbing the anti-reflective film with a wiper. The results are shown in Table 1 below.

<Measurement Standard>

◯: The number of rubbing actions required for erasing the straight line was 10 or less.

△: The number of rubbing actions required for erasing the straight line was 11 to 20.

X: The number of rubbing actions required for erasing the straight line was more than 20.

TABLE 1

|  | $R_0$(%) | $R_1$(%) | $\Delta R$ (% p) | $b^*_0$ | $b^*_1$ | $\Delta b^*$ | Scratch resistance (g) | Anti-fouling Property |
|---|---|---|---|---|---|---|---|---|
| Example 1 | 1.54 | 1.6 | 0.06 | −1.3 | −1.1 | 0.2 | 300 | ◯ |
| Example 2 | 1.6 | 1.61 | 0.01 | −2.1 | −1.9 | 0.2 | 800 | ◯ |
| Example 3 | 0.9 | 0.92 | 0.02 | −3.2 | −3.1 | 0.1 | 600 | ◯ |
| Example 4 | 0.31 | 0.33 | 0.02 | −3.7 | −3.9 | 0.2 | 300 | ◯ |
| Example 5 | 0.15 | 0.17 | 0.02 | −4.5 | −4.8 | 0.3 | 200 | ◯ |
| Example 6 | 1.45 | 1.47 | 0.02 | −3.1 | −3.3 | 0.2 | 500 | ◯ |
| Example 7 | 1.5 | 1.55 | 0.05 | −3.2 | −3.4 | 0.2 | 500 | ◯ |
| Comparative Example 1 | 1.53 | 1.76 | 0.23 | −1.4 | −0.1 | 1.3 | 300 | ◯ |
| Comparative Example 2 | 1.59 | 1.8 | 0.21 | −2.0 | −0.5 | 1.5 | 800 | ◯ |
| Comparative Example 3 | 0.88 | 1.13 | 0.25 | −3.3 | −1.5 | 1.8 | 600 | ◯ |
| Comparative Example 4 | 0.3 | 0.6 | 0.3 | −4.1 | −1.1 | 3.0 | 300 | ◯ |
| Comparative Example 5 | 0.17 | 0.5 | 0.33 | −5.2 | −2.1 | 3.1 | 200 | ◯ |
| Comparative Example 6 | 1.44 | 1.66 | 0.22 | −2.9 | −1.1 | 1.8 | 500 | ◯ |

As shown in Table 1, it was confirmed that in Examples 1 to 7, the degree of change of the average reflectance (ΔR) before and after the rubbing test was 0.02% p or less, and the degree of change in color (Δb*) before and after the rubbing test was 0.3 or less, and therefore, the increase in reflectance and the change in color were effectively suppressed at the portion that was damaged/deformed due to the rubbing test compared to Comparative Examples 1 to 6, thereby being excellent in visibility.

What is claimed is:

1. An anti-reflective film comprising a hard coating layer, and a low-refractive index layer satisfying Equation 1, $$0.2\% \, p \geq \Delta R = |R_1 - R_0| \qquad \text{[Equation 1]}$$

wherein in the Equation 1, $R_0$ is an average reflectance % of the low-refractive index layer before performing a rubbing test as measured in a wavelength range of 380 to 780 nm, and $R_1$ is an average reflectance % of the low-refractive index layer after performing the rubbing test as measured in a wavelength range of 380 to 780 nm, wherein the rubbing test is performed by rubbing a surface of the-low refractive index layer by applying a load of 500 g to a steel wool and reciprocating ten times at a speed of 33 rpm, and % p=ΔR, wherein ΔR is the degree of change of the average reflectance before and after the rubbing test, wherein the low refractive index layer comprises a binder resin, and two or more groups of hollow inorganic particles dispersed in the binder resin and having different particle diameters, wherein the two or more groups of hollow inorganic particles having different particle diameters include a first group of hollow inorganic particles having a particle diameter of 40 nm to 60 nm as measured by Dynamic Light Scattering (DLS), and a second group of hollow inorganic particles having a particle diameter of 65 nm to 100 nm as measured by Dynamic Light Scattering (DLS), and wherein a weight ratio between the first group of hollow inorganic particles and the second group of hollow inorganic particles is 7:3 to 3:7.

2. The anti-reflective film of claim 1, wherein the $R_0$ value in the Equation 1 is 0.1 to 2.0%.

3. The anti-reflective film of claim 1, wherein the $R_1$ value in the Equation 1 is 0.3 to 2.2%.

4. The anti-reflective film of claim 1, wherein the low-refractive index layer also satisfies Equation 2:

$$1 \geq \Delta b^* = |b^*_1 - b^*_0| \qquad \text{[Equation 2]}$$

wherein in the Equation 2, $b^*_0$ is a b* value in a CIE (L*a*b*) color coordinate system of the low-refractive index layer before the rubbing test as defined by the International Commission on Illumination, and $b^*_1$ is a b* value in a CIE (L*a*b*) color coordinate system of the low-refractive index layer after the rubbing test as defined by the International Commission on Illumination.

5. The anti-reflective film of claim 4, wherein the $b^*_0$ value in the Equation 2 is 2 to −10.

6. The anti-reflective film of claim 4, wherein the $b^*_1$ value in the Equation 2 is 3 to −9.

7. The anti-reflective film of claim 1, wherein the binder resin of the low-refractive index layer comprises a copolymer of a polyfunctional (meth)acrylate-based monomer containing a 2- to 4-functional (meth)acrylate-based monomer and a 5- or a 6-functional (meth)acrylate-based monomer.

8. The anti-reflective film of claim 7, wherein a weight ratio between the 2- to 4-functional (meth)acrylate-based monomer and the 5- or 6-functional (meth)acrylate-based monomer is 9:1 to 6:4.

9. The anti-reflective film of claim 7, wherein 2 to 4-functional (meth)acrylate-based monomer has a pentaerythritol structure at its center, represented by the following Chemical Formula 1

[Chemical Formula 1]

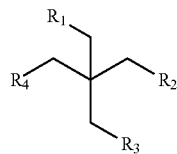

in Chemical Formula 1, $R_1$ to $R_4$ are a hydroxy group, a (meth)acrylate group, or a substituted or unsubstituted $C_{1-40}$ alkoxy group, with the proviso that at least one of them is a (meth)acrylate group, and the 5- or 6-functional (meth)acrylate-based monomer has a dipentaerythritol structure at its center, represented by the following Chemical Formula 2

[Chemical Formula 2]

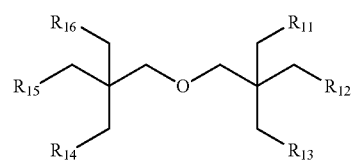

in Chemical Formula 2, $R_{11}$ to $R_{16}$ are a hydroxyl group, a (meth)acrylate group, or a substituted or unsubstituted $C_{1-40}$ alkoxy group, with the proviso that at least one of them is a (meth)acrylate group.

10. The anti-reflective film of claim 7, wherein the 2- to 4-functional (meth)acrylate-based monomer and the 5- or 6-functional (meth)acrylate-based monomer are included in a weight ratio of 9:1 to 6:4.

11. The anti-reflective film of claim 1, wherein the anti-reflective film further comprises a light-transmitting substrate of which retardation (Rth) in the thickness direction of 3000 nm or more as measured at a wavelength of 400 nm to 800 nm.

12. A polarizing plate comprising the anti-reflective film of claim 1.

13. A display apparatus comprising the anti-reflective film of claim 1.

14. A display apparatus comprising the polarizing plate of claim 12.

15. The anti-reflective film of claim 9, wherein the 2- to 4-functional (meth)acrylate-based monomer is selected from pentaerythritol di(meth)acrylate, pentaerythritol tri(meth)acrylate, or a mixture thereof, and wherein the 5- to a 6-functional (meth)acrylate-based monomer is selected from dipentaerythritol penta(meth)acrylate, dipentaerythritol hexa(meth)acrylate, or a mixture thereof.

16. The anti-reflective film of claim 10, wherein the weight ratio between the 2- to 4-functional (meth)acrylate-based monomer and the 5- to 6-functional (meth)acrylate-based monomer is 8.5:1.5 to 6.5:3.5.

* * * * *